UNITED STATES PATENT OFFICE.

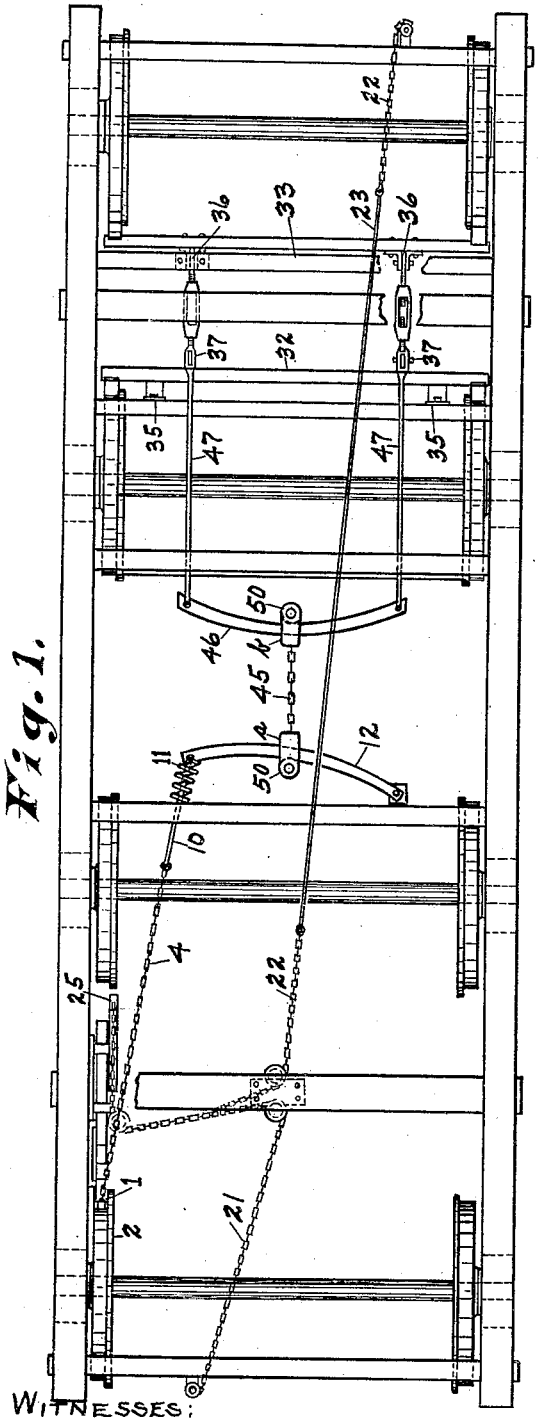

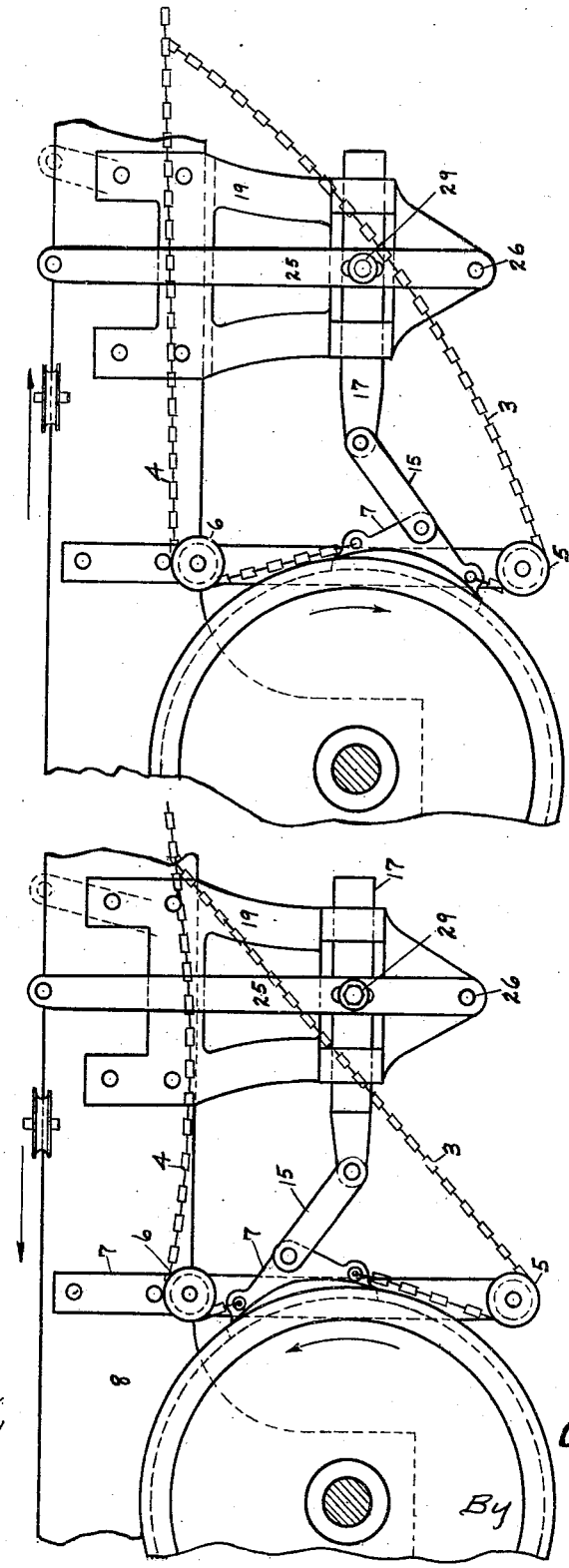

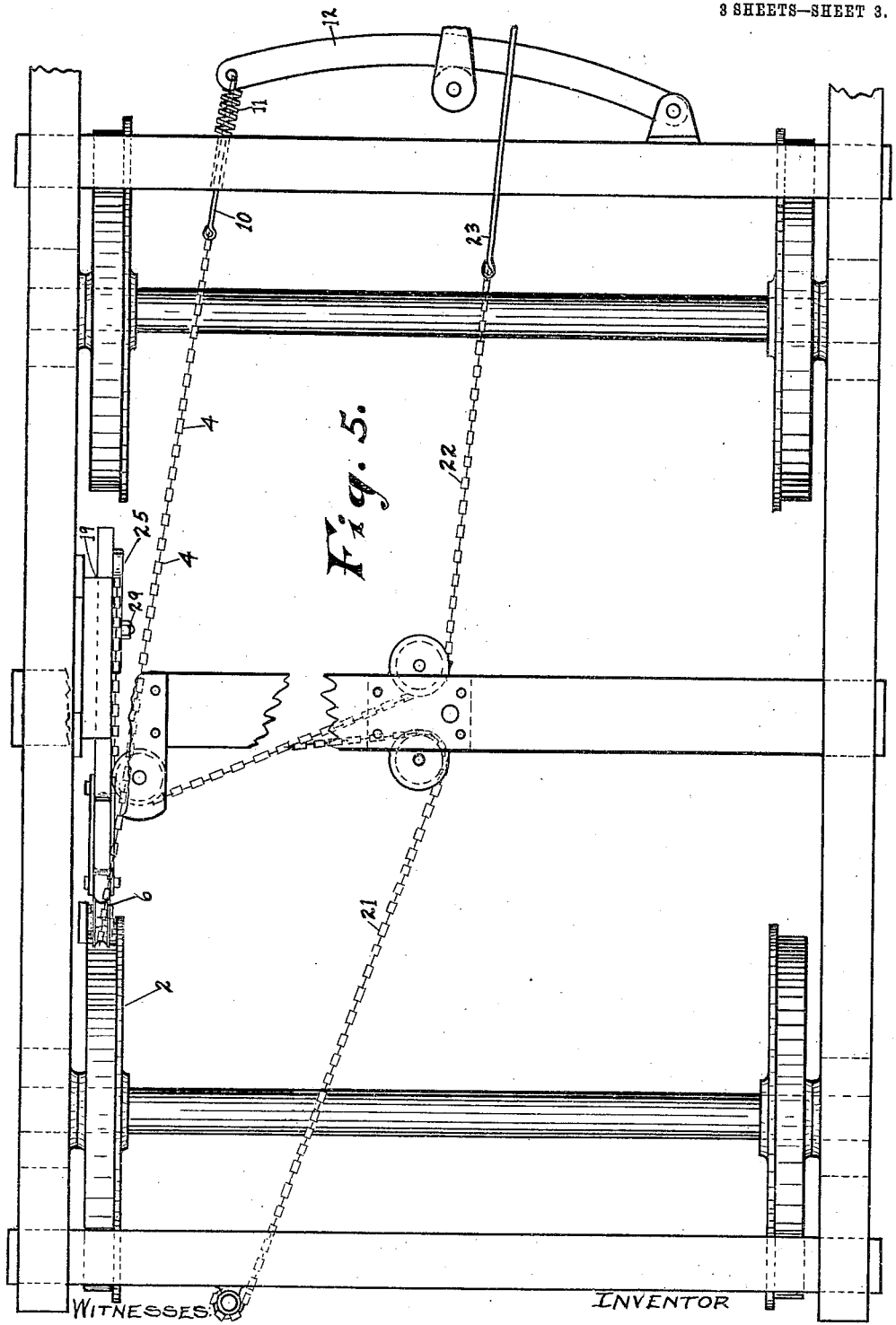

NICHOLAS P. ZECH, OF MILWAUKEE, WISCONSIN.

CAR-BRAKE.

938,935.

Specification of Letters Patent.

Patented Nov. 2, 1909.

Application filed March 26, 1909. Serial No. 485,897.

*To all whom it may concern:*

Be it known that I, NICHOLAS P. ZECH, a citizen of the United States, residing at Milwaukee, county of Milwaukee, and State of Wisconsin, have invented new and useful Improvements in Car-Brakes, of which the following is a specification.

My invention relates to improvements in brakes of the general type shown and described in re-issued Letters Patent of the United States, numbered 11821, dated April 10, 1900, issued to myself and John N. Zech.

The object of this invention is to provide means for effectively applying such brakes to double truck cars, and between the wheels of the respective trucks, the motion of the controlling brake, applied between the wheels of one truck, being transmitted to set the brakes between the wheels of the other truck.

In the following description, reference is had to the accompanying drawings, in which—

Figure 1 is a plan view of a double or four axled truck embodying my invention. Fig. 2 is a side view of the same. Fig. 3 is a detail side view of the controlling brake as it appears when acting upon a wheel traveling in the direction in which the brake moves to gripping position. Fig. 4 is a similar view, showing the position of the controlling brake when the car is traveling in the opposite direction. Fig. 5 is an enlarged plan view of the truck having the controlling brake shoe.

Like parts are identified by the same reference characters throughout the several views.

The controlling brake shoe 1 is supported in operative relation to a wheel 2 of the car, by means of chains 3 and 4, which extend over pulleys 5 and 6 respectively on a hanger 7 connected with the truck frame 8. These chains, after passing about their respective pulleys, are connected to a rod 10, resiliently connected by a spring 11 with a motion transmitting lever 12, whereby tension upon either chain may be utilized to actuate the lever. The brake shoe 1 is also connected by a link 15 with a sliding bar 17 mounted in bearings in a truck bracket 19, whereby a longitudinal movement of this bar in its bearings will move the brake to either releasing or clutching position. This bar is actuated from the platforms (not shown), at the respective ends of the car through a chain 21, (or chain and link 22 and 23), and a lever 25, the latter being connected with the chains 21 and 22 and pivoted to the bracket 19 at 26 and to the bar 17 at 29, the bar 17 being sufficiently loose in its bearings to permit it to move without cramping.

The main brake shoes 30 and 31 are directly connected, respectively, with brake beams 32 and 33, extending transversely of the other truck from that which carries the controlling brake shoe, and between the wheels of such truck,—the shoes 30 and 31 being faced in opposite directions in positions for gripping the opposing faces of the wheels.

The brake beam 32 is suspended from the truck frame by resilient arms 35. The brake beam 33 is suspended from the truck frame by links 36. Levers 37 are pivoted to projections 38 on the brake beam 32 and are connected with the links 36, (which also serve as levers), by the extensible rod 40, this rod being formed in sections connected by an ordinary turn buckle 41. With this construction, if the upper ends of the levers 37 are drawn toward the center of the car, it fulcrums upon the rod 40 and sets the brake 30. The rod 40 at the same time pushes outwardly on the lower ends of the links or levers 36 and thus sets the brake shoe 31. To actuate the levers 37 in this manner, motion is transmitted from the chain 3 (or 4), through the rod 10, spring 11, lever 12, flexible sliding link 45, equalizing bar 46 and rods 47, the latter being pivotally connected with the upper ends of the levers 37.

The flexible link connection 45 comprises a pair of forks *a* and *b*, which straddle the lever 12 and equalizing bar 46, both of which are segmentally curved in opposite directions with their convex margins opposing each other. Antifriction rollers 50 are mounted in the respective forks and bear upon the concave surfaces of the lever 12 and equalizing bar 46 respectively. These forks *a* and *b* are connected by any suitable chain or flexibly jointed links.

With the described construction, it is obvious that the controlling brake shoe 1 may be operated from either end of the car by means of the chain 21 or chain and link 22 and 23, either of which actuates the lever 25 in the direction to push the brake shoe 1 against the opposing car wheel. When this is done, the torque of the car wheel carries the shoe with it either to the position shown in Fig. 3 or to the position shown in Fig. 4, according to the direction of wheel revolution. For example, if the car is moving in the direction indicated by the arrows in Fig. 3, the brake shoe 1 will be lifted and its motion will be transmitted to set the other brakes through the chain 3 and the motion transmitting connections above described and which include the lever 12 and equalizing bar 46. When the car travels in the opposite direction, as indicated by the arrows in Fig. 4, the brake shoe will be drawn downwardly by the car wheel to the position illustrated in said figure, whereupon the torque of the wheel will be exerted through the chain 4 to set the other brakes. By utilizing the segmentally curved lever 12 and equalizing bar 46, the invention may be readily applied to a double truck car, since the pulleys or rollers 50 are free to move back and forth on the lever 12 and bar 50 respectively, thus permitting an independent movement of the trucks. This lever and bar 46 are curved substantially in the arc of truck movement, so that there will be no tendency to take up the slack in the transmitting connections and set the brake when the car is traveling on a curved track.

Having thus described my invention, what I claim as new, and desire to secure by Letters Patent, is—

1. The combination with the wheels of a car, of a set of brake shoes therefor, a controlling brake having flexible supports connected to actuate the first mentioned brake shoes, a rotary member in operative relation to the controlling brake, an actuating lever, a sliding bar connected therewith, and a link connecting said sliding bar with the controlling brake and adapted to transmit the motion of said lever to set such brake in gripping position on said rotary member.

2. The combination with the wheels of a car, of a set of brake shoes therefor, a rotary member, a controlling brake in operative relation thereto and having flexible supports connected to actuate the first mentioned brake shoes, an actuating lever, a sliding bar connected therewith, and a link connecting said sliding bar with the controlling brake and adapted to transmit the motion of said lever to set such brake in gripping position, together with flexible connections extending from opposite ends of the car around guide pulleys and arranged to actuate said lever in the same direction.

3. The combination with a car, provided with a plurality of wheeled trucks, of a set of brakes for the wheels of one of the trucks, actuating levers connected with each other and arranged to operate said brakes in opposite directions, an equalizing bar having link connections with some of said levers, a lever connected with the other of said trucks, and a traveling flexible connection between said lever and equalizing bar, and a controlling brake shoe connected with said last mentioned lever and adapted to be actuated by the car wheel, together with means for moving the controlling brake shoe into contact with a car wheel.

4. The combination with a wheeled truck, of a set of brake beams suspended from the truck between the front and rear wheels and provided with shoes adapted for contact with the respective wheels, levers connected with said beams for actuating the shoes into and out of gripping position, a controlling brake shoe suspended in operative relation to another car wheel and capable of a limited movement with the periphery of said wheel, an actuating lever flexibly connected with the controlling brake shoe, and means for transmitting the motion of said brake shoe to the brake beam actuating levers.

In testimony whereof I affix my signature in the presence of two witnesses.

NICHOLAS P. ZECH.

Witnesses:
CLIFFORD A. ROHE,
L. v. B. GRAY.